United States Patent [19]
Robinson

[11] Patent Number: 6,073,060
[45] Date of Patent: Jun. 6, 2000

[54] COMPUTERIZED MANUAL MAIL DISTRIBUTION METHOD AND APPARATUS

[76] Inventor: Forest Robinson, 9707 S. Green St., Chicago, Ill. 60643-1509

[21] Appl. No.: 09/053,314

[22] Filed: Apr. 1, 1998

[51] Int. Cl.⁷ ....................................................... B07C 5/00
[52] U.S. Cl. ........................... 700/223; 700/219; 705/406
[58] Field of Search .............................. 209/549; 700/223, 700/219; 705/406

[56] References Cited

U.S. PATENT DOCUMENTS

| | | | |
|---|---|---|---|
| 1,733,217 | 10/1929 | Cox, Jr. . | |
| 2,146,695 | 2/1939 | Brand et al. . | |
| 3,889,811 | 6/1975 | Yoshimura | 209/74 M |
| 3,904,516 | 9/1975 | Chiba et al. | 209/74 M |
| 4,181,948 | 1/1980 | Jackson et al. | 364/478 |
| 4,307,293 | 12/1981 | Lazzarotti et al. | 235/462 |
| 4,358,016 | 11/1982 | Richardson et al. | 209/564 |
| 4,797,940 | 1/1989 | Sato et al. | 382/9 |
| 4,832,204 | 5/1989 | Handy et al. | 209/3.3 |
| 5,260,694 | 11/1993 | Remahl | 340/674 |
| 5,414,634 | 5/1995 | Morgan et al. | 364/478 |
| 5,677,834 | 10/1997 | Mooneyham | 700/83 |
| 5,794,789 | 8/1998 | Payson et al. | 209/549 |

OTHER PUBLICATIONS

Voice Sort brochure, D&K Wiley Enterprises, Moutain City, Tennessee

*Primary Examiner*—Paul P. Gordon
*Assistant Examiner*—Kidest Bahta
*Attorney, Agent, or Firm*—McAndrews, Held & Malloy, Ltd.

[57] ABSTRACT

A manually operated mail sorting station sorts pieces of unsorted mail into numerous bins in a case for holding sorted mail. The mail sorting station includes a scanner for reading an address from a piece of unsorted mail and the scanner includes a communication interface. The mail sorting station also includes a computer connected to the communication interface. The computer includes a program responsive to the address transmitted by the scanner over the communication interface. The program includes instructions that store the address in memory, a scheme representing an assignment of addresses to bins in the case, wherein the assignment maps addresses to individual postal delivery routes for Postal Service carriers in a predetermined city section, the individual delivery routes assigned at least one bin in the case, and instructions that match the address against the scheme to select one of the bins in the case as a matched bin for the piece of unsorted mail.

18 Claims, 2 Drawing Sheets

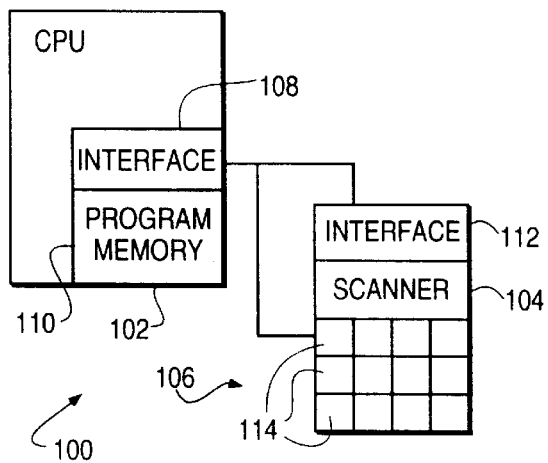
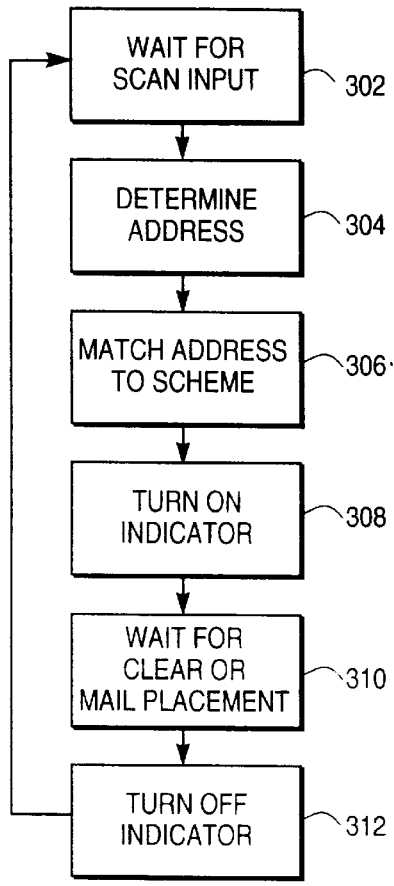
FIG. 2
| SPEC | 7  | 32 | 58 | 12 |   | 3    | 24 | 25 | 54 | SPEC |
|------|----|----|----|----|---|------|----|----|----|------|
| SPEC | 8  | 33 | 48 | 9  |   | 4    | 13 | 26 | 53 | SPEC |
| SPEC | 51 | 37 | 47 | 18 |   | 1    | 39 | 27 | 52 | SPEC |
| SPEC | 60 | 21 | 50 | 11 | A | 19   | 6  | 28 | 49 | SPEC |
| 22   | 55 | 5  | 23 | 14 | B | 17   | 31 | 30 | 46 | 44   |
| 20   | 15 | 40 | 43 | 29 | C | 10   | 38 | 59 | 45 | 56   |
| 2    | 16 | 41 | 34 | OVERS | D | OVERS | 35 | 36 | 42 | 57   |

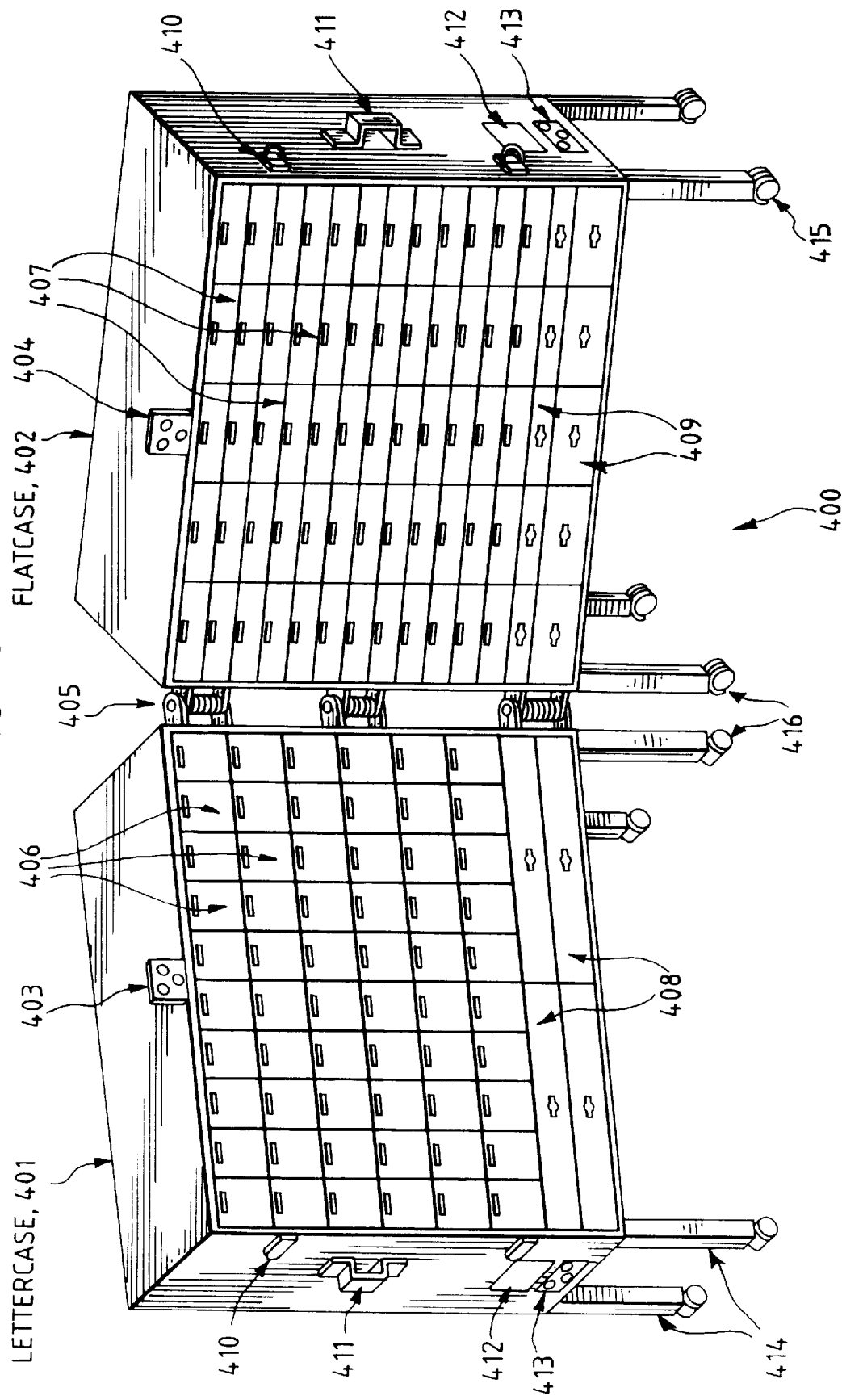

COMPUTERIZED MANUAL MAIL DISTRIBUTION METHOD AND APPARATUS

BACKGROUND OF THE INVENTION

This invention relates to an apparatus for mail sorting. In particular, the present invention relates to a computer controlled mail sorting system that eliminates the memorization of scheme knowledge and case or rack diagram knowledge inherent in previous manual mail sorting processes.

Vast quantities of mail are entrusted with postal services around the world for accurate and timely delivery. In the United States, the Postal Service processed approximately 182.7 billion pieces of mail in 1996 alone, an average of approximately 603 million pieces of mail each day. Approximately 53.3% of the mail processed was First Class mail, approximately 39.3% was Standard Mail (A) and approximately 5.5% was Periodicals. Nearly one billion pieces of mail were Foreign mail. The delivery network in the United States reaches nearly 128 million addresses and the United States Postal Service (USPS) handles over 43% of the worldwide mail volume. In comparison, Japan, the second largest carrier of cards and letters, handles only 6%. The foregoing statistics and additional information are available on the official USPS world wide web site at www.usps.gov.

The USPS in a given city, for example Chicago, generally segments the bulk mail collected between mail destined for Chicago, and mail destined for other cities ("outgoing" mail). The outgoing mail is shipped to receiving post offices located in the other cities, while the mail destined for Chicago is further sorted into Primary and Secondary mail, and finally goes through a Carrier assignment before delivery. Mail destined for sections of the city served by the main USPS office is termed Primary mail, and is delivered by routing each piece of mail to the individual carrier handling the section of the city indicated by the address. The carrier then hand delivers the mail. Mail bearing addresses handled by branch USPS offices is termed Secondary mail and is forwarded to the particular branch office handling those addresses. In Chicago, for instance, Station 41 handles secondary mail to a section of the city corresponding to the zip code 60641. At each secondary station, each piece of mail is sorted to an individual carrier handling the address on the mail.

In order to efficiently handle the vast quantities of mail it is called upon to deliver, the USPS uses electronic sorting and automation equipment. From 1987–1996, the USPS committed approximately $4.3 billion for installation of equipment at postal facilities throughout the country to automate letter mail processing. The equipment includes, for example, optical readers, and delivery barcode sorters. One type of high-speed sorting apparatus is disclosed, for example, in U.S. Pat. No. 3,889,811 to Yoshimura, entitled "Flat-Article Sorting Apparatus for an Automatic Mail Handling System and the Like". Even with the sophisticated sorting equipment of today, however, a certain percentage, and consequently large numbers of pieces of mail are not read correctly (or at all) and wind up as reject letters for additional processing. Although machine handling technology has rapidly advanced, the processing of unsorted reject mail is still accomplished manually by USPS employees. In other words, high speed sorting apparatuses are unable to further sort rejected letters.

Highly trained USPS employees (hereafter "sorters") are responsible for manually sorting the reject mail. Each unsorted rejected letter must eventually be assigned to a carrier for delivery. Each carrier may, for example, be assigned to a bin in a sorting case in which the sorted mail is placed awaiting carrier pickup. In particular, when the rejected letter needs to be sorted to particular carriers for delivery, the sorters require nearly perfect knowledge of an elaborate and complicated "scheme" as well as a case diagram to perform their responsibilities.

A scheme is a mapping between addresses (or ranges of addresses) and bins in a case (corresponding to carriers who deliver to those addresses and to secondary stations). A scheme may require, for example, knowledge of 1000 address areas. A piece of mail that falls outside of the scheme address area is placed in a holding bin for delivery to another sorter.

Furthermore, each sorter needs to memorize a case or rack configuration. The case and rack configuration includes knowledge of where each bin in the case is located, and knowledge (in conjunction with scheme knowledge) of how each bin in the case is assigned to carriers and addresses. Even when a small number of streets and a small number of carriers exist, the number and complexity of the different possible schemes and case configurations grows exponentially.

The scheme may also include a foreign address component that directs the sorter to place letters with foreign addresses in an assigned bin. It is noted that the general term "bin" as used in this specification may correspond to holding areas in, for example, a rack (used to sort small parcels), a case (used to sort letters), or a container (used to sort large parcels). It is further noted that the mail sorting apparatus described in this specification is not limited to letters, but may be used to sort parcels, periodicals, priority mail, and the like.

Teaching sorters a scheme is a time, labor, and money consuming task. In Chicago, for instance, it is not uncommon to train a sorter for over six months before the sorter becomes proficient in a single scheme. After a sorter learns a scheme, the sorter is then limited to sorting mail destined for delivery in that scheme, and may not move to other schemes without extensive retraining. Thus, the USPS operations are sensitive to sorters who become sick and cannot work, sorters who quit, or sorters who desire to change work location.

Furthermore, many sorters in training become discouraged at the complexity of the knowledge they have to acquire, and quit partially through training. Thus a new sorter must begin training from the beginning. Assuming the sorter makes it through training, there is no guarantee that the sorter will be able to retain the complex scheme knowledge. Thus, sorters often make mistakes which lead to late delivered, reprocessed, or undelivered mail. Moreover, the complexity of the schemes, in combination with the time pressures involved in delivering the mail, contributes greatly to a stressful work environment at the USPS.

Because of the extensive training needed to teach a sorter a scheme, the USPS only reluctantly reassigns carriers to new or different routes. Such changes would require the sorter to relearn a portion of, or in some cases, all of the scheme. Thus, the USPS is hampered in its attempts to dynamically assign carriers to delivery addresses in order to keep schemes efficient as the city changes, for example, as the city grows and streets are added, extended, or changed to residential zoning.

A need has long existed in post offices for a computerized manual mail sorting system that eliminates scheme knowledge and case knowledge.

BRIEF SUMMARY OF THE INVENTION

It is an object of the present invention to eliminate the necessity for sorters to memorize scheme knowledge and case configurations.

It is another object of the present invention to more quickly sort mail rejected by high speed automated sorting. It is noted that the present invention may also handle foreign mail and mail of widely varying types, including letters, small parcels, large parcels, bulk mail, priority mail, and business mail.

Yet another object of the present invention is to reduce the costs associated with sorting mail rejected by high speed automated sorting.

Another object of the present invention is to increase the accuracy of sorting of mail rejected by high speed automated sorting.

Still another object of the present invention is to allow a post office to change its schemes without requiring expensive, complex, and time consuming retraining of sorters.

Yet another object of the present invention is to provide statistics concerning the sorter, for example, sorting speed and accuracy, and statistics concerning the sorted items, for example, the volume and characteristics of sorted items.

The present invention provides a manually operated mail sorting station which includes a case having numerous bins in which sorted mail will be placed. The mail to be sorted typically includes articles rejected, for example, from high speed mail sorting machines, but may also include mail gathered from other sources. The manually operated mail sorting station includes a scanner that reads an address printed on the pieces of unsorted mail. The scanner includes a communications interface over which the scanner sends signals during operation. A computer for the mail sorting station is also provided and is connected to the communications interface of the scanner.

The computer further includes a program responsive to the signals transmitted by the scanner on the communications interface. The program generally includes instructions that store the signals in an internal address representation (translating, if necessary, the signals sent by the scanner) which may be a sequence of letters and numbers representing an address). The program also defines or stores a scheme representing an assignment of addresses to bins in the sorting case as well as instructions that match the internal address representation against the scheme to select one of the bins as the correct bin for the piece of unsorted mail.

Optionally, the manually operated mail sorting station provides each of the bins in the sorting case with an indicator having an ON state and an OFF state. The indicator may be a light, bell or chime, computer generated voice, or the like. The computer is further connected to the case for controlling each of the indicators. The program also includes instructions selectively setting an indicator to the ON state in response to the matched bin as determined by the instructions that match the internal address representation against the scheme. The program also includes instructions that set the indicator to the OFF state in response to the piece of unsorted mail being placed in the matched bin.

BRIEF DESCRIPTION OF THE DRAWINGS

FIG. 1 illustrates the components of one embodiment of a mail sorting station according to the present invention.

FIG. 2 shows an example case, bins in the case, and assignments for each bin in the case.

FIG. 3 shows a flowchart disclosing the step-by-step operation of the mail sorting station.

FIG. 4 illustrates a convenient folding case including a letter sorting section and a flat sorting section.

DETAILED DESCRIPTION OF THE INVENTION

Turning now to FIG. 1, a block diagram of a mail sorting station 100 is shown. The mail sorting station includes a computer 102, a scanner 104, and a case 106. The computer 102 includes an interface 108, program memory 110, and may also include input/output devices including keyboards, mice, and printers, for example. The scanner 104 includes an interface 112 and the case 106 includes numerous bins 114 in which mail may be placed.

The computer communicates with the scanner 104 using a connection between the computer interface 108 and the scanner interface 112. The connection may be a direct wire connection or cable connection, or may be a wireless connection (for example, an infrared or RF connection). Furthermore, the computer interface 108 and the scanner interface 112 may be implemented, for example, as serial ports, parallel ports, or network connections. Similarly, the computer 102 may connect to the case 106 through a direct wire or cable connection, or may connect to the case 106 through a wireless connection.

In operation, a sorter uses the scanner 104 to scan a rejected letter. The scanner 104 may, for example, be an optical scanner similar to those available from Bell & Howell, 3000 E. Malmo Dr. Arlington Heights, Ill. 60005. The scanner 104 is preferably installed in the case 106 but may be also be a hand-held scanner. The scanner 104 sends signals representing the result of the scanning operation to the computer 102 using the scanner interface 112. With sophisticated scanners, the signals may directly represent address information from the rejected letters. For example, the scanner may scan the mail, interpret the scanning results, then send the result to the computer 102 as signals representing a series of ASCII characters defining an address. Alternatively, a less sophisticated scanner may send signals to the computer 102 that the computer 102 interprets using Intelligent Character Recognition (ICR) or Optical Character Recognition (OCR) software to determine the address on the rejected letters. Such software is available, for example, from Acumen Systems Inc., 1481 47 Street, Brooklyn, N.Y. 11219.

The characters forming the address on the rejected letters are stored in an internal address representation in the computer memory 110 for further manipulation and retrieval. The internal address representation may, for example, be a series of ASCII characters making up the address stored sequentially in memory. Alternatively, the internal address representation may be implemented, for example, as a data structure with entries for address, city, state, and zipcode. Once a piece of unsorted mail has been scanned, the internal address representation is matched against a scheme stored in the program memory 110.

A scheme defines a mapping between addresses and bins 114 in the case 106. The bins 114 are generally assigned to particular USPS carriers who take the contents of the bins 114 on their routes for hand delivery. Turning now to FIG. 2, one example of a case 106 with bins 114 is shown. The bins 114 are generally labeled numerically according to the carrier assigned to that bin or to a postal station assigned to the bin (for Secondary mail). Special bins ("SPEC"), overseas bins, ("overs"), and slot locations ("A"–"D") are provided for mail for special delivery, foreign mail, and for slots in which the scanner 104 may be installed.

As one simple example of a scheme, all addresses on Main street may be assigned to carrier/bin 7, all addresses on Clark street may be assigned to carrier/bin 32, all other United States addresses assigned to bin 58 (corresponding, for example, to a secondary postal station), and all other foreign addresses assigned to bin 12. At the secondary postal station, another scheme may be implemented that maps additional addresses to bins and additional secondary stations.

In operation, the computer matches the internal address representation against the scheme to select one of the bins as the correct bin for the piece of unsorted mail. Thus, the computer may determine that the internal address representation corresponds to a Main street address and select bin 7 as a match. As another example, an internal address representation that corresponds to Jackson street may match bin 58 for delivery to a secondary postal station for eventual delivery by a USPS carrier working at the secondary postal station.

The computer 102 may display the matching bin on an attached screen (not shown). The sorter may then place the unsorted mail into the matched bin according to the bin identified on the screen. Alternatively, the computer may print out the matched bin number or use a text-to-speech converter in conjunction with a speaker to pronounce the matched bin number. In a preferred embodiment, however, the computer controls an indicator associated with the matched bin to indicate to the sorter into which bin the unsorted mail should be placed. In this respect, reference is made to U.S. Pat. No. 4,181,948 to Jackson et al., entitled "Computer Directed Manual Sorting Aid" the entirety of which is incorporated herein by reference.

As noted above, individual indicators are provided for each of the bins 114 covered by the scheme. The indicators generally have an ON state and an OFF state. For example, a light, LED, or other display may be turned ON to indicate the matching bin. Alternatively, a voice output may be generated that audibly guides the sorter to the correct bin (e.g., a voice that announces: "bin 15"). As another example, the indicator may be a tone, bell, or chime that in the ON state produces an audible frequency that guides the sorter to the matching bin and that in the OFF state is quiet. The indicator may then be turned OFF when a detector (for example, a photodetector) associated with the matching bin senses that a piece of mail has been placed in the matching bin and communicates the sensory information to the computer 102. Furthermore, detectors attached to non-matching bins may send back an error signal over the connection between the case 106 and the computer 102 in the event they sense that the unsorted mail has been placed in a non-matching bin. The computer 102, in turn, may sound an alarm, display an error message, or the like.

In addition, any indicator may be returned to the OFF state after a CLEAR event. A CLEAR event may occur, for example, when a predetermined time has elapsed without a detector sensing that the unsorted mail has been placed in the correct bin. A CLEAR event may also occur, for example, when a key assigned to the CLEAR event is pressed on a keyboard attached to the computer.

The connection between the computer 102 and the case 106 may be constructed as a wire or cable connection or as a wireless link implementing a serial, parallel, network connection, or the like. The case 106 may include an independent microcontroller with programmable outputs to control the indicators, communications, and sensor data. Alternatively, the case 106 may include simple discrete logic to control the ON/OFF states of the indicators, handle communications, and send back sensor data.

Turning now to FIG. 3, that figure illustrates the general flow of operation 300 of the software instructions stored in the program memory 110. At step 302, the computer 102 waits for the scanner 104 to scan an address and send signals to the computer 102 through the scanner interface 112. At step 304, the internal address representation is generated and stored in the program memory 110. Next, step 306 matches the internal address representation against the scheme stored in the program memory 110 (or implemented as a data segment of the software instructions stored in the program memory 110). The match selects a bin in 114 in which the unsorted mail should be placed. At step 308, the computer 102 communicates with the case 106 to turn on the indicator associated with the matched bin. Subsequently, the software instructions wait at step 310 for the unsorted mail to be placed in the matched bin, or for a CLEAR event. Finally, at step 312, the computer 102 returns the indicator to the OFF state and resumes processing at step 302.

Thus, the present invention eliminates the need for time consuming, limiting, and expensive sorter scheme training. The sorting of rejected letters is accomplished more quickly, accurately, and cost effectively (and with less manual labor) than was required with the manual sorting process in the past. Schemes and case configurations may be changed without undue delays in retraining sorters simply by updating the scheme stored in the computer 102. Updated schemes and case configurations may be quickly and easily updated via floppy disk, network connection, and the like. Furthermore, the schemes may handle domestic mail in addition to foreign mail.

A convenient folding case 400 is illustrated in FIG. 4. The folding case 400 includes a computerized letter case 401 and a computerized flat case 402. The computerized letter case includes a letter scanner slot 403 (where a letter scanner may be mounted), letter bins 406, and letter storage drawers 408 (used to store letters when the capacity of the letter bins 406 are exceeded). Similarly, the computerized flat case 404 includes a flat scanner slot 404 (where a flat scanner may be mounted), flat bins 407, and flat storage drawers 409. The folding case 4 further includes a latch 410 for locking the folding case 400, handles 411 for closing the folding case 400, and cups 412 for holding rubber bands, paper clips, and the like.

The folding case 400 further includes interfaces 413 for connecting to one or more computer interfaces 108. The interfaces 413 may be physical connectors for coupling to a wire cable from the computer 102, or may be sensors or transceivers for communicating via RF or infrared channels. Hinges 405 are provided for closing the folding case 400. Legs 414 are also provided. Attached to the legs 414 are wheels 416 and wheel locks 415. The folding case 400 may also be used in conjunction with the computer 102 to match addresses to schemes.

The folding case 400 folds along hinges 405 for easy storage and rolls on the wheels 416 for easy movement. The folding case 400 may include a set of sensors and indicators for the letter bins 406 and the flat bins 407 as described above and independently controllable by the computer 102.

It is further noted that any type of case used for sorting rejects need not be initially manufactured with sensors, indicators, or an interface for the computer 102. Rather, the sensors, indicators, and interface may be added later using, for example, a frame that outlines each bin in the case. The frame may then include the sensors and indicators described above and be fitted into place on the case. Furthermore, the interface may be positioned at any location on the frame to provide communications between a case (with frame) and the computer 102.

The computer 102 may further gather statistics on the sorting process, including both the sorter and the items sorted. For example, the computer 102 may monitor, using its connection to the case 106 and indicator feedback from the case 106, the speed with which a sorter places mail into a bin, how often the sorter places mail in an incorrect bin, and the like. Additionally, the computer 102, using its connection to the scanner 104, may gather statistics relating to the sorted items. For instance, the computer 102 may monitor the volume of letters destined for particular addresses. Increases in volume may be useful, for example, in identifying high speed sorting machinery that needs service or that is malfunctioning.

The present invention is also useful in non-postal settings to sort any type of article. As an example, the address scheme representation in the computer 102 may be replaced with an electronic parts scheme. The scanner 104 may then read bar codes or other indicia on the electronic parts and the computer may then store an internal identification representation corresponding, for example, to ASCII characters representing a part number, serial number, or the like. The computer 102 may then match the internal identification representation to the electronic parts scheme, and turn on the indicator corresponding to the bin into which the electronic part should be placed. Again, the computer 102 may gather statistics relating to the sorter or the sorted articles.

While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications and incorporate those features which come within the spirit and scope of the invention.

What is claimed is:

1. A manually operated mail sorting station for sorting pieces of unsorted mail, the pieces of unsorted mail to be sorted into a plurality of bins in a sorting case for holding sorted mail, the mail sorting station comprising:
   a scanner for reading an address on a piece of unsorted mail, the scanner including a communication interface;
   a computer connected to the communication interface including a program responsive to the address transmitted by the scanner on the communication interface, the program comprising:
   instructions that store the address in a memory;
   an updateable scheme representing an assignment of addresses to bins in the sorting case, wherein the assignment maps addresses to individual postal delivery routes for Postal Service carriers, the individual delivery routes assigned at least one bin in the sorting case;
   an updateable case configuration separate from the updateable scheme that specifies a physical location of each bin in the sorting case; and
   instructions that match the address against the scheme to select a bin in the sorting case as a matched bin for the piece of unsorted mail, wherein the sorting case comprises wheels for mobility, a letter case connected to a folding hinge, a flat case connected to the folding hinge, and a sorting case interface coupled to the communication interface.

2. The manually operated mail sorting station of claim 1, wherein:
   each of the bins in the sorting case includes an indicator with an ON state and an OFF state; and
   wherein the computer is further connected to the case for controlling each of the indicators; and
   wherein the program further comprises instructions selectively setting an indicator to the ON state in response to the matched bin as determined by the instructions that match the address against the scheme, and further comprising instructions setting the indicator to the OFF state in response to the piece of unsorted mail being placed in the matched bin.

3. The manually operated mail sorting station of claim 2, wherein the program further comprises instructions setting the indicator to the OFF state in response to a CLEAR event.

4. The manually operated mail sorting station of claim 2, wherein
   each of the bins in the sorting case includes a sensor that indicates when the piece of unsorted mail has been placed in the bin; and
   wherein the program further comprises instructions that activate an alarm in response to a sensor signal indicating that the piece of unsorted mail has been placed in a bin other than the matched bin.

5. The manually operated mail sorting station of claim 2, wherein the indicator is a light.

6. The manually operated mail sorting station of claim 2, wherein the indicator is a voice.

7. The manually operated mail sorting station of claim 4, wherein the program further comprises instructions gathering statistics on the sorting process.

8. A method of manually operated a mail sorting station for sorting pieces of unsorted mail, the pieces of unsorted mail to be sorted into a sorting case comprising a plurality of bins for holding sorted mail, the method comprising:
   providing a scanner and a scanner interface, and a computer connected to the scanner interface;
   scanning an address on a piece of unsorted mail;
   providing a program sorted in the computer, the program:
      storing the address received from the scanner in memory;
      defining an updateable scheme representing an assignment of addresses to bins in the sorting case wherein the assignment maps addresses to individual postal delivery routes for Postal Service carriers, the individual delivery routes assigned at least one bin in the sorting case;
      defining an updateable case configuration separate from the updateable scheme that specifies a physical location of each bin in the sorting case; and
      matching the address against the scheme to select a bin as a matched bin for the piece of unsorted mail, wherein the sorting case includes wheels for mobility, a letter case connected to a folding hinge, a flat case connected to the folding hinge, and a sorting case interface coupled to the communication interface.

9. The method of claim 8, further comprising:
   providing each of the bins in the sorting case with an indicator having an ON state and an OFF state;
   connecting the computer to the sorting case for controlling each of the indicators; and
   selectively setting an indicator to the ON state in response to the matched bin as determined by the instructions that match the address against the scheme, and setting the indicator to the OFF state in response to the piece of unsorted mail being placed in the matched bin.

10. The method of claim 9, further comprising the step of setting the indicator to the OFF state in response to a CLEAR event.

11. The method of claim 10, further comprising the steps of providing each of the bins in the sorting case with a sensor that indicates when the piece of unsorted mail has been placed in the bin; and activating an alarm in response to a sensor signal indicating that the piece of unsorted mail has been placed in a bin other than the matched bin.

12. The method of claim 9, wherein said providing step provides an indicator that is a light.

13. The method of claim 9, wherein said providing step provides an indicator that is a voice.

14. The method of claim 11, further comprising the step of gathering statistics on the sorting process.

15. A manually operated sorting station for sorting unsorted articles, the unsorted articles to be sorted into a plurality of bins in a sorting case for holding sorted articles, the sorting station comprising:

a scanner for reading indicia on the unsorted articles, said scanner including a communications interface;

a computer connected to the communications interface and including a program responsive to the indicia transmitted by the scanner on the communications interface, the program comprising:

instructions that store the indicia in a memory;

an updateable scheme representing an assignment of indicia to bins in the sorting case wherein the assignment maps indicia to individual postal delivery routes for Postal Service carriers, the individual delivery routes assigned at least one bin in the sorting case;

an updateable case configuration separate from the updateable scheme that specifies a physical location of each bin in the sorting case; and instructions that match the indicia against the scheme to select a bin in the case as a matched bin for the unsorted article, wherein the sorting case comprises wheels for mobility, a letter case connected to a folding hinge, a flat case connected to the folding hinge, and a sorting case interface coupled to the communication interface.

16. The manually operated sorting station of claim 15, wherein:

each of the bins in the sorting case includes an indicator with an ON state and an OFF state; and wherein the computer is further connected to the sorting case for controlling each of the indicators; and wherein the program further comprises instructions selectively setting an indicator to the ON state in response to the matched bin as determined by the instructions that match the indicia against the scheme, and further comprising instructions setting the indicator to the OFF state in response to the unsorted article being placed in the matched bin.

17. The manually operated mail sorting station of claim 16, wherein each of the bins in the sorting case includes a sensor that indicates when the unsorted article has been placed in the bin; and wherein the program further comprises instructions that activate an alarm in response to a sensor signal indicating that the unsorted article has been placed in a bin other than the matched bin.

18. The manually operated mail sorting station of claim 16, wherein the indicator is a light.

* * * * *